United States Patent
Osha

[11] Patent Number: 6,151,175
[45] Date of Patent: Nov. 21, 2000

[54] TRACKING MIRROR FOR A TOW VEHICLE

[76] Inventor: Jonathan P. Osha, 18111 River Oaks Rd., Damon, Tex. 77430

[21] Appl. No.: 09/327,589

[22] Filed: Jun. 8, 1999

[51] Int. Cl.[7] .............................. G02B 5/08; G08G 1/16; G01C 1/08

[52] U.S. Cl. ....................... 359/843; 359/841; 340/903; 33/264

[58] Field of Search .......................... 359/838, 841–843, 359/872, 877, 601–608; 33/264, 268; 340/901, 903, 904

[56] References Cited

U.S. PATENT DOCUMENTS

| | | | |
|---|---|---|---|
| 3,741,633 | 6/1973 | Haley | 359/841 |
| 3,868,176 | 2/1975 | Young | 359/841 |
| 4,257,706 | 3/1981 | Smith | 33/264 |
| 4,645,315 | 2/1987 | Morgavo | 33/264 |
| 5,056,905 | 10/1991 | Jensen | 359/843 |
| 5,132,851 | 7/1992 | Bomar et al. | 359/843 |
| 5,196,965 | 3/1993 | Lang et al. | 359/841 |
| 5,249,083 | 9/1993 | Doughtie et al. | 359/843 |
| 5,325,096 | 6/1994 | Pakett | 342/70 |
| 5,627,688 | 5/1997 | Valentino | 359/843 |
| 5,659,423 | 8/1997 | Schierbeek et al. | 359/603 |
| 5,668,675 | 9/1997 | Fredricks | 359/843 |
| 5,684,647 | 11/1997 | Rouleau | 359/843 |
| 5,719,713 | 2/1998 | Brown | 359/843 |
| 5,786,772 | 7/1998 | Schofield et al. | 340/903 |
| 5,835,291 | 11/1998 | Takayama | 359/843 |
| 5,993,013 | 11/1999 | Greiner | 359/605 |

FOREIGN PATENT DOCUMENTS

| | | |
|---|---|---|
| 62-181943 | 8/1987 | Japan . |
| 1-502255 | 8/1989 | Japan . |
| 3-500630 | 2/1991 | Japan . |
| 8500323-4 | 1/1985 | Norway . |

*Primary Examiner*—Thong Nguyen
*Attorney, Agent, or Firm*—Rosenthal & Osha L.L.P.

[57] ABSTRACT

An automatic adjustment system for maintaining a line of sight between a driver and a rear end of a trailer towed by a tow vehicle is disclosed. A transmitter and a receiver are coupled proximal a side-view mirror. A reflector is mounted proximal the rear end of the trailer and is adapted to receive a signal from the transmitter and to reflect the signal to the receiver. A control unit is provided for determining a deviation from an initial value of a selected property of the signal, the initial value corresponding to an orientation of the mirror when the line of sight is established. An actuator responsive to the controller orients the mirror such that the value of the selected property of the signal is returned to the initial value.

25 Claims, 7 Drawing Sheets

TRACKING MIRROR FOR A TOW VEHICLE

FIELD OF INVENTION

The invention relates to mirrors used for vehicles. More specifically, the invention relates to the automatic control of side-view mirrors used on tow vehicles, i.e., vehicles designed to pull trailers.

BACKGROUND

Vehicles are typically equipped with various means to enable the vehicle operator to view the rear end of the vehicle or a trailer coupled to the vehicle. There is generally a rearview mirror coupled to the upper center of the windshield providing a view directly to the rear of the vehicle. There are also typically side-view mirrors on each side of the vehicle providing views to the rear and down the side of the vehicle and any coupled trailer. When a vehicle is used to pull a trailer, the rearview mirror mounted in the center of the windshield generally cannot be used to view behind the vehicle because the view is blocked by the trailer. In this case, the driver generally must rely solely on the side-view mirrors for guidance.

Side-view mirrors on tow vehicles are often upright, rectangularly shaped devices that are manually adjusted by the driver. They are mounted far enough forward from the driver to provide a field of vision down the sides of the vehicle and coupled trailer. Some of these mirrors also have smaller convex mirrors attached that help eliminate the "blind spot" that is present between the driver's view through the side-view mirrors and the driver's view out the side of the vehicle. The field of view of the convex mirror is typically very small because they are usually mounted on the surface of the larger mirror, and distance judgement from the view is difficult due to the nature of the image on the convex mirror. The views from these manually adjusted side-view mirrors and attached convex mirrors are adequate when the vehicle and trailer are traveling straight ahead, but these views become obstructed when the vehicle makes a turn. When the vehicle turns, the path of the vehicle centerline changes with respect to the path of the trailer centerline and the view on one side will be of the side of the trailer some distance forward of the rear end. This makes it difficult for the driver of the tow vehicle to navigate a turn, particularly when the turn is made toward the passenger side of the vehicle. The driver has no easy way to maintain a line of sight with the rear end of the trailer and possibly avoid any vehicles or obstructions that may be present in the adjacent lane.

Figure 1A:
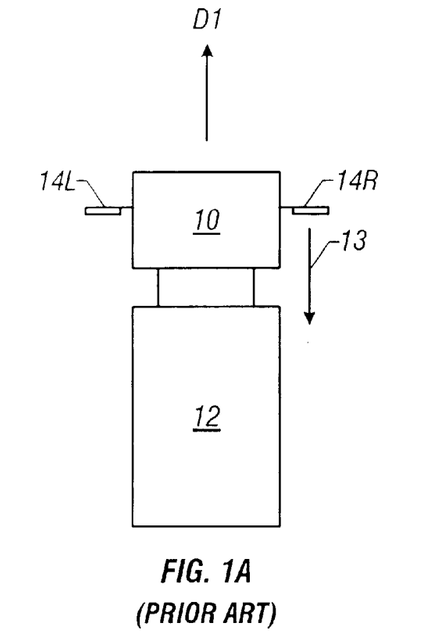
FIGS. 1A and 1B illustrate an example of a conventional tow vehicle-trailer mirror system.
Figure 1B:
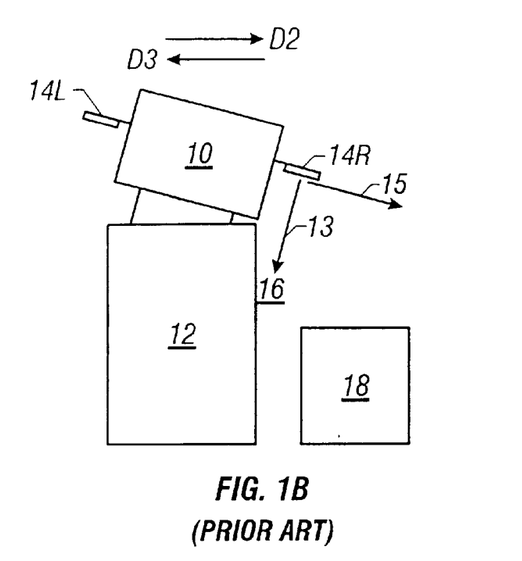

FIGS. 1A and 1B illustrate the disadvantages of a conventional vehicle-trailer mirror system. In FIG. 1A, a "tractor-type" tow vehicle 10 is coupled to a trailer 12. The tow vehicle 10 has a right side-view mirror 14R and a left side-view mirror 14L. As the tow vehicle 10 and trailer 12 change from direction D1 to direction D2 as shown in FIG. 1B, the line of sight of the right side-view mirror 14R, indicated by arrow 13, changes from being directed along the side of the tow vehicle 10 and trailer 12 to a point 16 some distance forward of the rear of the trailer 12. If another vehicle or an obstruction 18, such as a curb, is present between point 16 and the rear of the trailer 12, the driver will not be able to see it because there is no longer a line of sight between the driver and the rear of the trailer 12. There is a danger that the rear of the trailer 12 may collide with the obstruction 18 as the turn progresses since the driver may be unaware of the obstruction 18. The presence of a convex mirror would not solve the problem because the image of the obstruction 18, if present in the convex mirror's field of view at all, would be in the extreme periphery of the image, and it would be difficult for the driver to interpret the exact position of the obstruction 18 relative to the trailer 12. The line of sight is not so much of a problem when the tow vehicle 10 and trailer 12 are turning in direction D3. In this instance the driver may look out the driver side window and establish line of sight with the rear of the trailer 12. However, as illustrated by the arrow 15 in FIG. 1B, when the tow vehicle 10 is turned in the direction D2, the driver's line of sight out of the passenger window is extremely limited and does not allow the driver to see obstruction 18. It is for this reason tractor trailers frequently carry a warning on the back stating "caution, this vehicle makes wide right turns."

The lack of a means for conveniently adjusting mirrors 14L and 14R to maintain line of sight with the rear of the trailer 12 when making a right turn has been a longstanding problem. One attempt to remedy the problem is shown in Jensen et al. (U.S. Pat. No. 5,056,905). In the Jensen '905 patent, a wireless signal transmitter and receiver are located near the rear of the trailer. A continuous signal is emitted at a fixed angle from the transmitter. When a turn is initiated, the signal will eventually approach the mirror and will be reflected to the receiver. When the signal is received, a drive unit reorients the side mirror. This system requires a permanently mounted structure on the trailer. Thus, the driver cannot switch between trailers unless the system has been outfitted on all trailers used by that company. U.S. Pat. No. 5,132,851 issued to Bomar et al. and U.S. Pat. No. 5,719,713 issued to Brown show ways to use ultrasonic transducer systems to measure the variation in the distance between the back of the vehicle cab and the front of the trailer as a turn is made. Measurements from multiple sensors are used to establish the angle between the vehicle and the trailer. This system does not require modification of the trailer, but it is a complex system with significant installation problems and cost. Swedish Published Application No. 447,087 shows a similar system for reflecting a signal off the front of the trailer. Other attempts have been made by taking angular measurements at a "fifth wheel" location near the trailer hitch with proximity sensors (see U.S. Pat. No. 5,835,291 issued to Takayama) and mechanical means (U.S. Pat. No. 5,627,688 issued to Valentino and U.S. Pat. No. 5,684,647 issued to Rouleau). These inventions electronically or physically measure the relative angle between the vehicle and the trailer to adjust the side mirrors to compensate for any deviance.

SUMMARY OF INVENTION

The invention relates to an automatic mirror positioning apparatus for maintaining a line of sight between a side-view mirror coupled to a tow vehicle and a trailer. The apparatus of the invention includes a tracking mirror assembly coupled to the tow vehicle some distance forward of the driver and a reflective apparatus coupled to a rear end of the trailer.

The invention also relates to a method for maintaining line of sight between the driver of a tow vehicle and the rear end of a trailer. The method includes the steps of sending a signal from a transmitter located on the tow vehicle, reflecting the signal from a reflective apparatus located proximal to the rear end of the trailer, receiving the reflected signal, and orienting a mirror to maintain a selected property of the detected signal at a selected value.

In the preferred embodiment of the invention the tracking mirror assembly includes a transmitter/receiver unit coupled to a mirror that is attached to a forward end of a tow vehicle.

A signal is sent from the transmitter and reflected from a reflective apparatus coupled proximal to a rear end of a trailer. The receiver receives the reflected signal, and a specific property of the signal is analyzed so that a control unit can direct an actuator to orient the mirror to maintain the specific property of the signal at a selected value regardless of the angular relationship between the tow vehicle and the trailer.

DETAILED DESCRIPTION

Various exemplary embodiments of the invention will now be described with reference to the accompanying drawings. Like items in the drawings are shown with the same reference numbers.

Figure 2A:
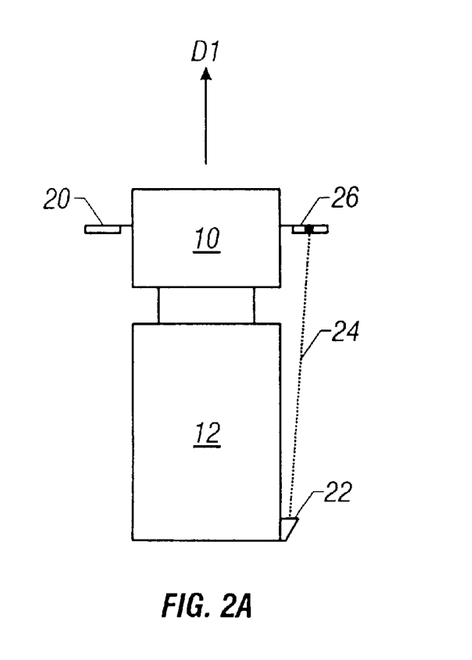
FIGS. 2A and 2B are schematic illustrations of the operation of the tracking mirror assembly in an embodiment of the invention.
Figure 2B:
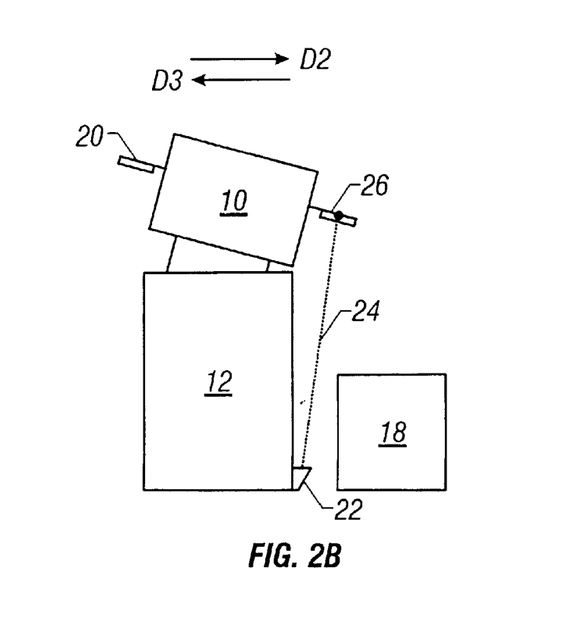

One embodiment of the invention is shown in FIG. 2A, wherein a tow vehicle 10 is coupled to a trailer 12. Two mirrors are coupled to the forward end of tow vehicle 10. Left-side mirror 20 can be a conventional side-view mirror while right-side mirror 26 is a tracking mirror assembly that automatically adjusts to maintain a line of sight 24 with a rear end of the trailer 12. A reflective apparatus 22 is coupled proximal to the rear end of the trailer 12. FIG. 2B is another view of the tow vehicle 10 and the trailer 12 after a turn has been initiated in direction D2. The line of sight 24 is maintained between the tracking mirror assembly 26 and the reflective apparatus 22 regardless of the relative positions of the tow vehicle 10 and the trailer 12. As described in more detail below, reflective apparatus 22 is preferably coupled to trailer 12 with non-permanent means such as magnets, Velcro, or the like.

Figures 3, 4:
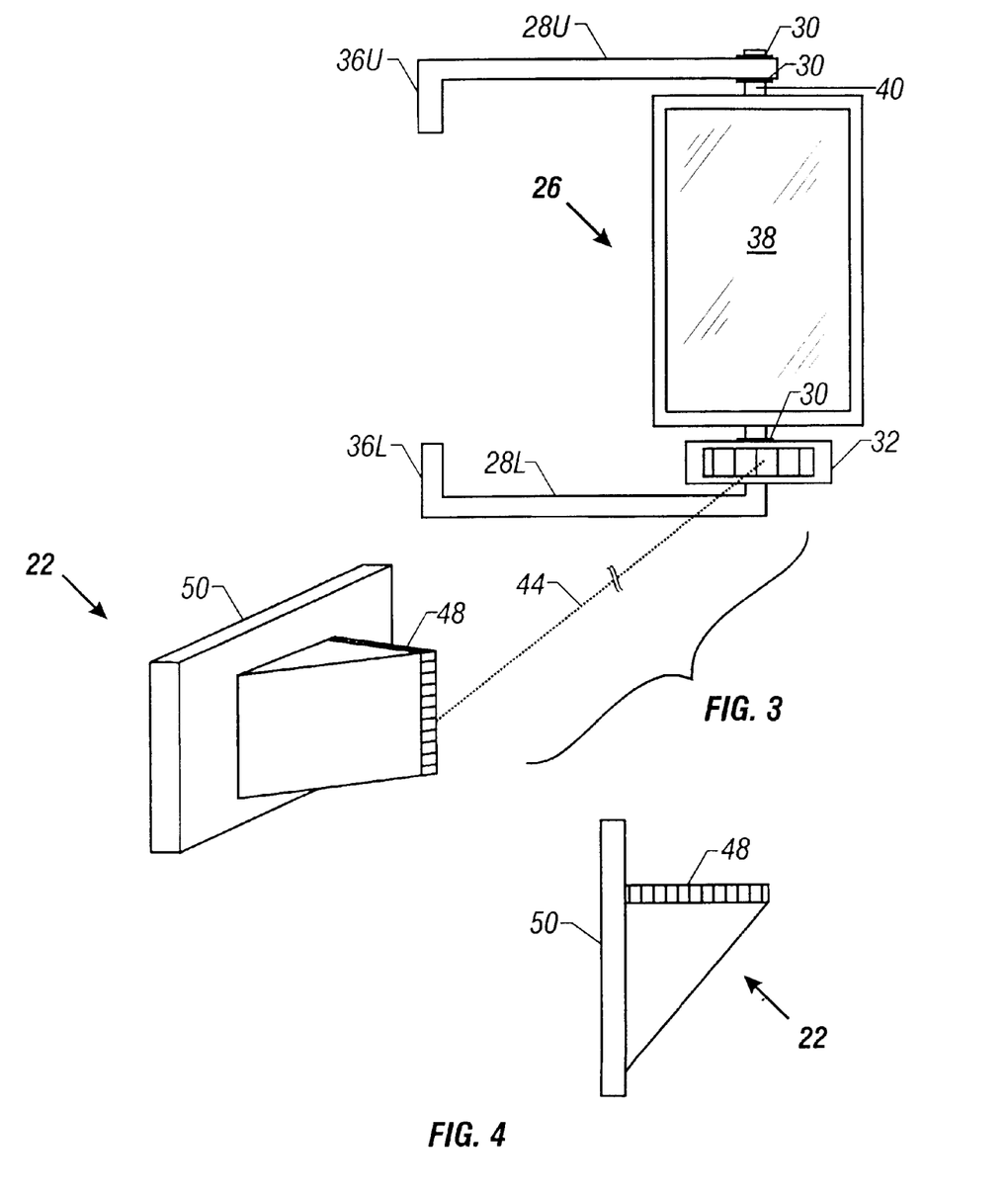
FIG. 3 is an idealized view of the tracking mirror assembly and the reflective apparatus of an embodiment of the invention.
FIG. 4 is a top view of the reflective apparatus according to an embodiment of the invention.

FIG. 3 shows the tracking mirror assembly 26 and the reflective apparatus 22 in more detail. A mirror 38 is coupled to a pivotally mounted bar 40. The mirror 38 may be manually set by the driver to an initial position that establishes the line of sight 24 (shown in FIG. 2A) with the rear end of the trailer 12 (shown in FIG. 2A) when in a straight position. Mirror 38 may also be set in the initial position by remote mechanical and electronic adjustment mechanisms or by any other means known in the art. The pivotally mounted bar 40 is cooperatively coupled to an upper horizontal brace 28U and a lower horizontal brace 28L through an axial support 42 (shown in FIG. 6) and radial supports 30. The axial support 42 (shown in FIG. 6) and radial supports 30 are shown comprising bearings in FIGS. 3, 6, and 8, and roller, needle, tapered roller, ball, and other conventional bearings are suitable. The axial support 42 (shown in FIG. 6) and radial supports 30 may also comprise bushings and a combination of bearings and bushings. The upper horizontal brace 28U and lower horizontal brace 28L are arranged to be mounted to the tow vehicle 10 with an upper mounting bracket 36U and a lower mounting bracket 36L. The means of attachment to the vehicle body is not critical and may either be permanent or removable.

In this embodiment, a transmitter/receiver unit 32 is located near a lower end of pivotally mounted bar 40 near the lower horizontal brace 28L. It should be noted that the pointing axis of the transmitter/receiver unit 32 need not be perpendicular to the face of the mirror 38. The compact arrangement permits the tracking mirror assembly 26 to be easily assembled into a new vehicle or retrofitted to an existing vehicle. It will be understood, however, that any mounting position or arrangement of transmitter/receiver unit 32 would be acceptable provided there is a mechanical connection to allow adjustment of the mirror position.

The transmitter/receiver unit 32 has an aperture 34 through which a signal 44 is transmitted and received. The signal 44, after being transmitted from the transmitter/receiver unit 32 through aperture 34, is reflected by the reflective apparatus 22. The reflective apparatus 22 is provided with an attachment surface 50 that may be supplied with a magnet, Velcro, or other means of removable attachment to the trailer 12. The removable attachment enables the driver to readily move the reflective apparatus 22 from trailer to trailer as required. As long as the tow vehicle 10 is equipped with the tracking mirror assembly 26, any trailer 12 may be provided with the removable reflective apparatus 22 and make use of the safety advantages the tracking mirror system presents. If a permanent attachment is desired, the reflective apparatus 22 may be connected to the trailer 12 with a weld, adhesive, bolts, screws, or other conventional means known in the art. The signal 44 is returned from reflective surface 48 to the transmitter/receiver unit 32 through aperture 34.

The signal 44 may be any one of or a combination of different types of energy, including optical energy, acoustic energy, and radio frequency energy. If optical energy is employed it may be infrared light, polarized visible light, laser light, or any other type of optical energy. The term "radio frequency energy" as used herein refers to all frequencies between audible sound and light. Other signal types known in the art may be used as well. The signal type is not intended to limit the invention.

When the vehicle 10 to which the tracking mirror assembly 26 is coupled begins a turn to the right D2 (shown in FIG. 2B), the relative position of the reflective apparatus 22 and the aperture 34 changes. In a manner described in more detail below, the transmitter/receiver unit 32 detects the relative change in the signal 44 and causes the pivotally mounted rod 40, the mirror 38, and a transmitter/receiver 52 to rotate about the vertical axis of pivotally mounted bar 40 to restore the original relationship between the aperture 34 and reflective apparatus 22. As a result, regardless of the angle change between the tow vehicle 10 on which the tracking mirror assembly 26 is cooperatively coupled and the trailer 12 on which the reflective apparatus 22 is cooperatively coupled, the mirror 38 will maintain line of sight 24 (shown in FIG. 2B) between the driver and the rear end of the trailer 12.

FIG. 4 is a top view of an embodiment of reflective apparatus 22 with reflective surface 48 and attachment surface 50. The reflective surface 48 may be an integral part of the reflective apparatus 22 or may be a separate component permanently or removably coupled thereto. The reflective surface 48 may also be a property of the base material of the reflective apparatus 22. It should be understood that any suitable means of reflecting the signal 44 is sufficient and that the structure of the reflective apparatus 22 should not limit the invention.

Figure 5:
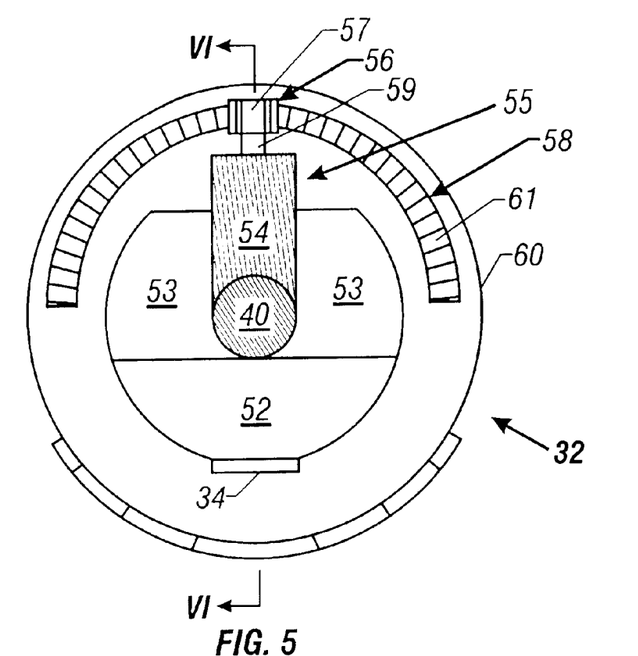
FIG. 5 is a partial section view from the top of the transmitter/receiver unit according to an embodiment of the invention.
Figure 6:
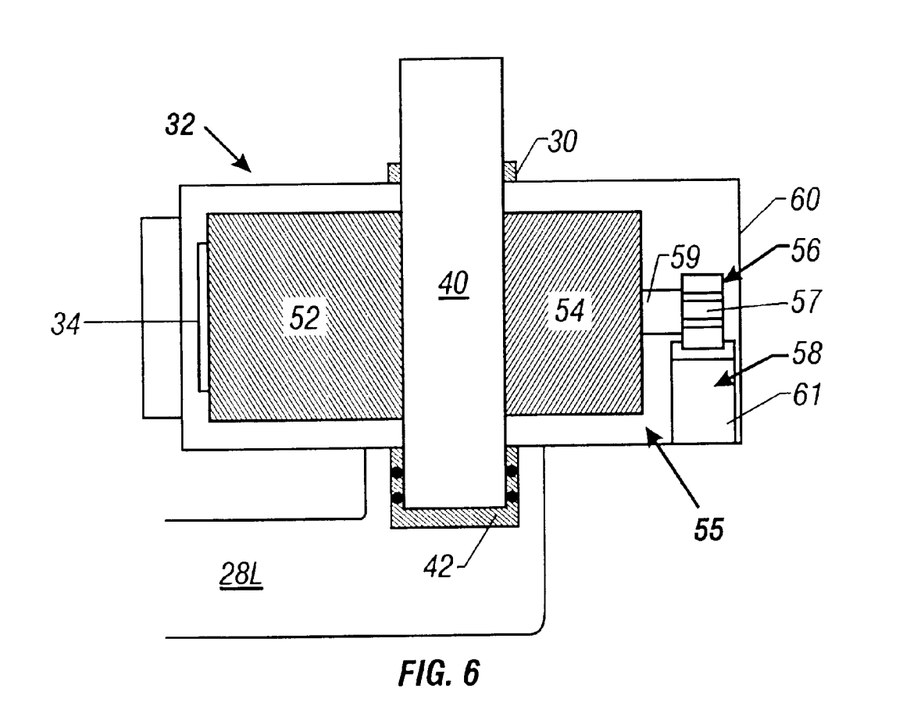
FIG. 6 is a partial section view along the lines of VI—VI of FIG. 5.

As shown in FIGS. 5 and 6, one embodiment of the transmitter/receiver unit 32 comprises the aperture 34, the transmitter/receiver 52, and a control unit 53 within a protective housing 60. The protective housing 60 is provided with an opening for aperture 34 and is centered about the lower end of pivotally mounted rod 40. Protective housing 60 preferably is made of durable plastic, metal, or a similar durable material known in the art to encase the transmitter/receiver unit 32. In this embodiment, the protective housing 60 is coupled to the lower horizontal brace 28L. The transmitter/receiver 52 is located proximal to the control unit 53 and to aperture 34. The control unit 53 comprises a signal processor (not shown), a controller (not shown), and an actuator mechanism 55.

The signal processor determines a specific property of the signal 44 received by the transmitter/receiver 52 through aperture 34 and sends a corresponding voltage or similar input message to the controller. The specific property of signal 44 may be intensity, phase, time to travel, or another property that varies with the angular or distal relationship between the transmitter/receiver 52 and the reflective apparatus 22. The controller operates on the input message from the signal processor and sends a voltage or similar control message to the actuator mechanism 55. The actuator mechanism 55, in turn, rotates the pivotally mounted bar 40, the mirror 38, and the transmitter/receiver 52 such that the initial relationship of the aperture 34 and reflective apparatus 22 is restored. Restoring the initial relationship maintains the line of sight 24 (shown in FIG. 2B) between the tracking mirror assembly 26 and the rear end of the trailer 12. If the signal 44 is interrupted, a provision may be made for restoring the initial relationship of the aperture 34 and reflective apparatus 22. The initial relationship may be recovered from a memory location, restored through a searching algorithm, or restored through other means known in the art. The actuator mechanism 55 preferably includes an actuator 54, an actuator drive mechanism 56, and an associated housing drive mechanism 58.

In the embodiment shown in FIGS. 5 and 6, the actuator drive mechanism 56 includes a pinion gear 57 coupled to the shaft 59 of the actuator 54. The housing drive mechanism 58 includes a semicircular gear 61 with teeth that engage the pinion gear 57 of the actuator 54. The housing drive mechanism 58 may also comprise a horizontal rack or similar mechanism in which the actuator 54 is in a relatively horizontal position. The housing drive mechanism 58 can be cooperatively coupled to the protective housing 60 such that movement of the actuator drive mechanism 56, which engages the housing drive mechanism 58, produces a rotation of the pivotally mounted bar 40 and the mirror 38 to maintain line of sight 24 as described in detail above.

Figure 7:
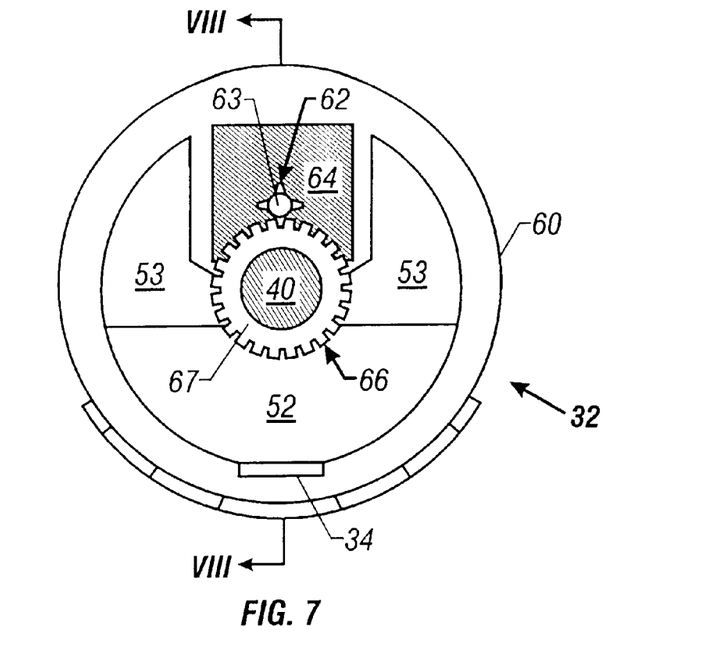
FIG. 7 is a partial section view from the top of the transmitter/receiver unit according to another embodiment of the invention.
Figure 8:
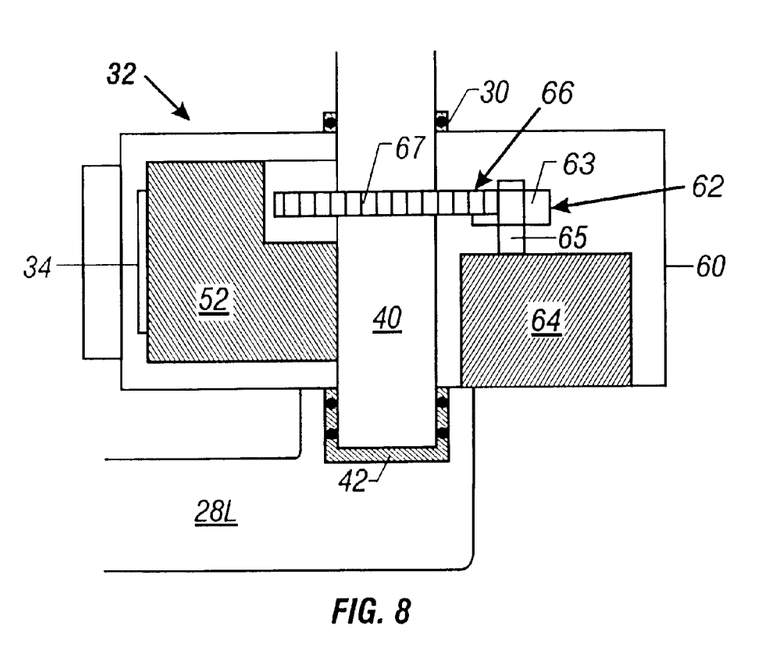
FIG. 8 is a partial section view along the lines of VIII—VIII of FIG. 7.

FIGS. 7 and 8 illustrate another embodiment of the actuator drive mechanism. In this embodiment, the actuator drive mechanism 62 includes a pinion gear 63 coupled to a shaft 65 of an actuator 64. However, in this embodiment the actuator 64 is located in a relatively vertical position with reference to the rotational axis of the pivotally mounted bar 40. The housing drive mechanism 66 includes a planetary or similar gear 67 or a vertical rack with teeth that engage the pinion gear 63 teeth of the actuator drive mechanism 62. In the embodiment, the housing drive mechanism 66 is mounted coaxially with the pivotally mounted bar 40 and will produce the orientation of the mirror 38 in a means similar to that described for the first embodiment above. These are only two possible arrangements by which the actuator and mirror may be interconnected. Other means known in the art, such as an elastomer belt drive, a metal belt drive, or a magnetic drive mechanism may be used to produce relative motion between the actuator and the mirror.

Figure 9:
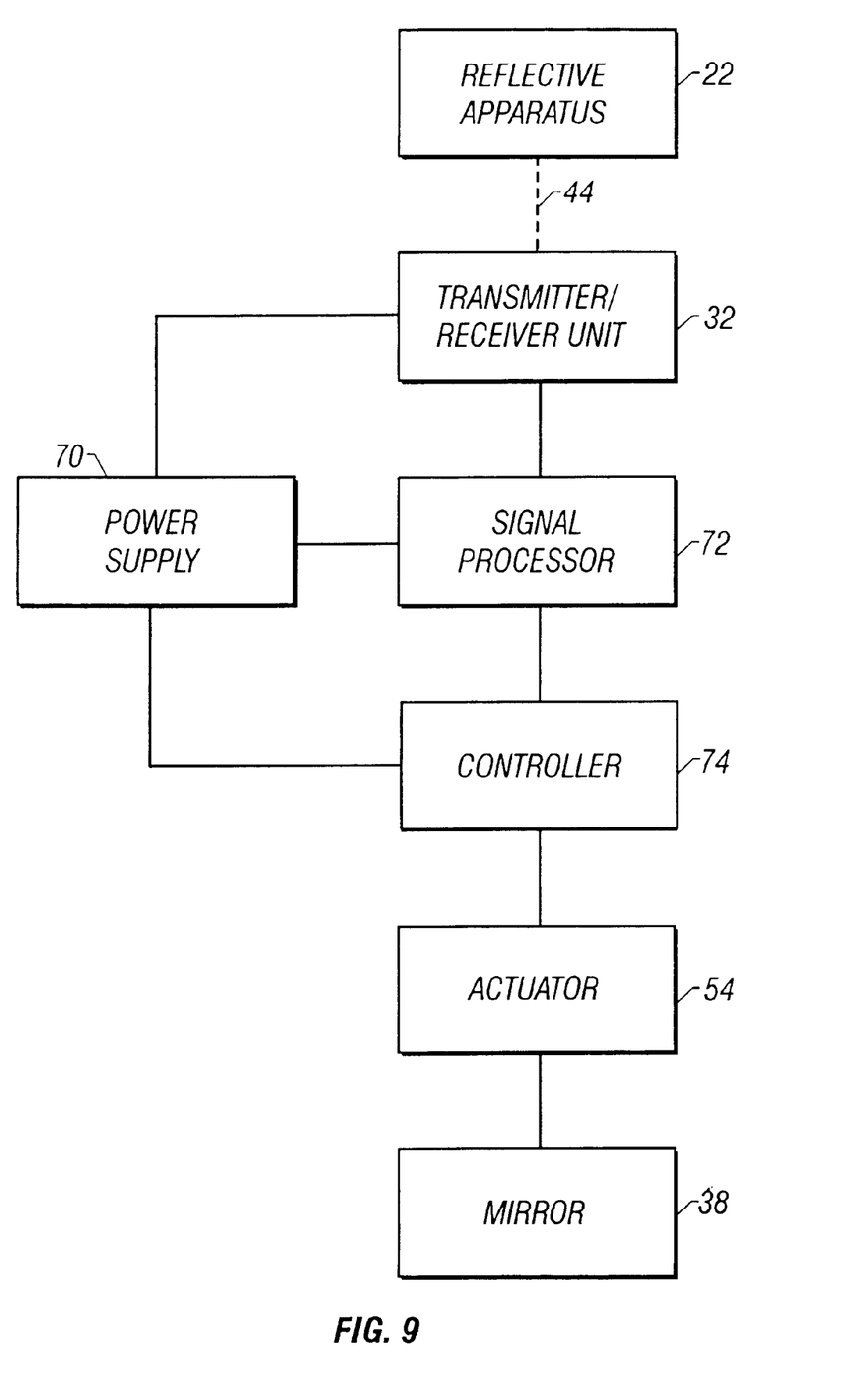
FIG. 9 is a schematic diagram of the tracking mirror assembly system according to an embodiment of the invention.

FIG. 9 shows a system schematic layout for an embodiment of the invention. A power supply 70 may be 12 volt such as typically supplied by the vehicle 10 (shown in FIG. 2A) or may be provided by an auxiliary source such as a battery. The signal 44 is transmitted and received by the transmitter/receiver unit 32 and is reflected by the reflective apparatus 22. The signal is interpreted by a signal processor 72 that, in turn, sends an appropriate command to a controller 74. The controller directs the actuator 54 to incrementally orient the mirror 38 to maintain the line of sight between the mirror 38 and the rear end of the trailer 12. FIG. 9 is provided for illustration of one possible system schematic and should not be construed as a limitation of the invention.

Figure 10A:
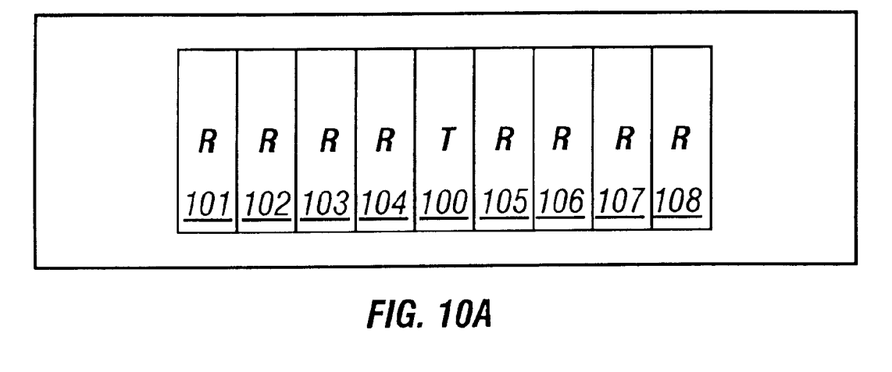
FIG. 10A shows a transmission and detection apparatus of an embodiment of the invention.
Figure 10B:
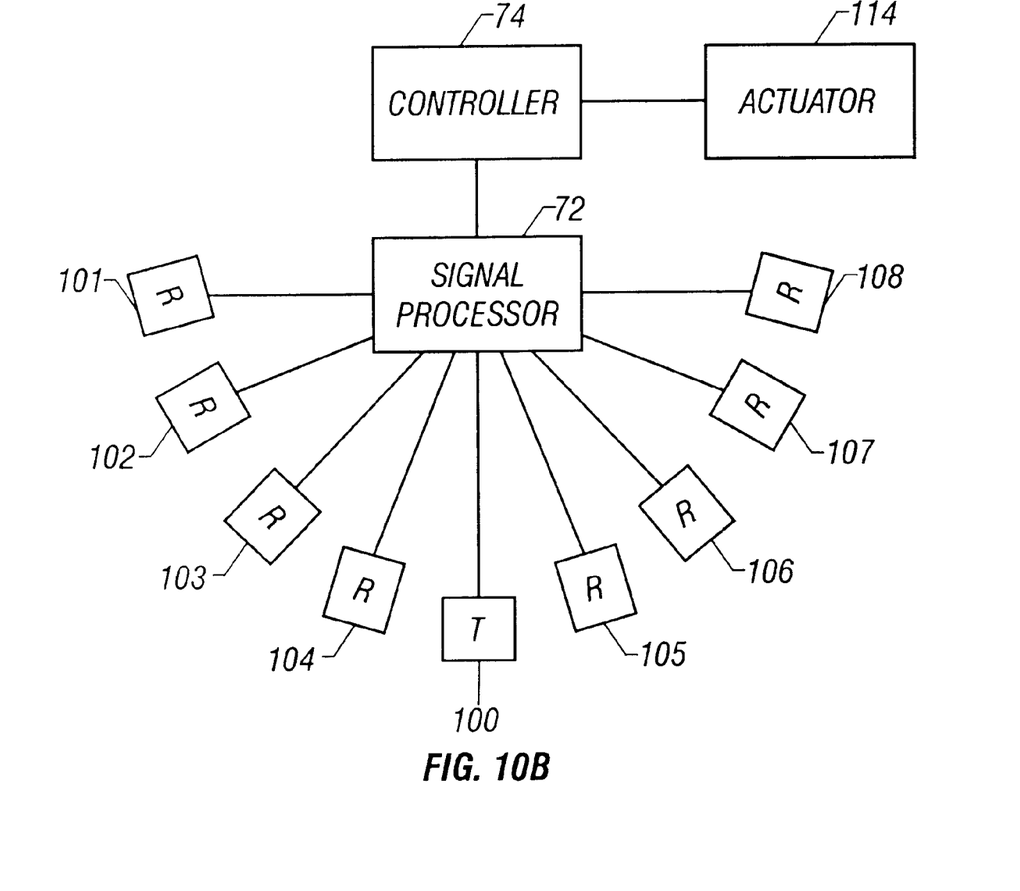
FIG. 10B is a schematic diagram for the embodiment shown in FIG. 10A.

FIG. 10A shows a transmission and detection apparatus of an angular measurement embodiment of the invention. In this embodiment of the invention, the transmitter/receiver unit 32 (shown in FIG. 6) includes a transmitter 100 and a plurality of receivers 101–108. A receiver array, a radial receiver, or any other receiver arrangement known in the art may be used as well. The receivers 101–108 are arranged cooperatively with the transmitter 100 to detect a specific property of the signal 44 (shown in FIG. 3). The relative strength of the signal 44 (shown in FIG. 3) detected by the receivers 101–108 may be used to determine the desired orientation of the mirror 38 (shown in FIG. 3). A system schematic for this embodiment is provided in FIG. 10B.

The following is an example of one possible detection sequence. The transmitter 100 transmits the signal 44 (shown in FIG. 3) to the reflective apparatus 22 (shown in FIG. 3), which returns the signal 44 (shown in FIG. 3) proximal to the receivers 101–108. More than one receiver will detect the signal 44 (shown in FIG. 3). For example, if the tow vehicle 10 (shown in FIG. 2B) initiates a right turn the signal 44 (shown in FIG. 3) will be most strongly detected at receivers 106–108. In this case, the signal 44 (shown in FIG. 3) will be interpreted by a signal processor 72 and a controller 74 will command an actuator 114 to incrementally rotate the mirror 38 (shown in FIG. 3) in an effort to make the signal reception strongest at receivers 104 and 105. When the signal 44 (shown in FIG. 3) is most strongly detected at receivers 104 and 105, the line of sight 24 (shown in FIG. 2B) between the mirror 38 (shown in FIG. 3) and the rear end of the trailer 12 (shown in FIG. 2B) will be established. A similar process occurs when the tow vehicle 10 (shown in FIG. 2A) returns to straight-ahead travel or initiates a turn to the left. Many other ways to achieve this result are known in the art and this example is not intended to limit the invention.

Figure 11A:
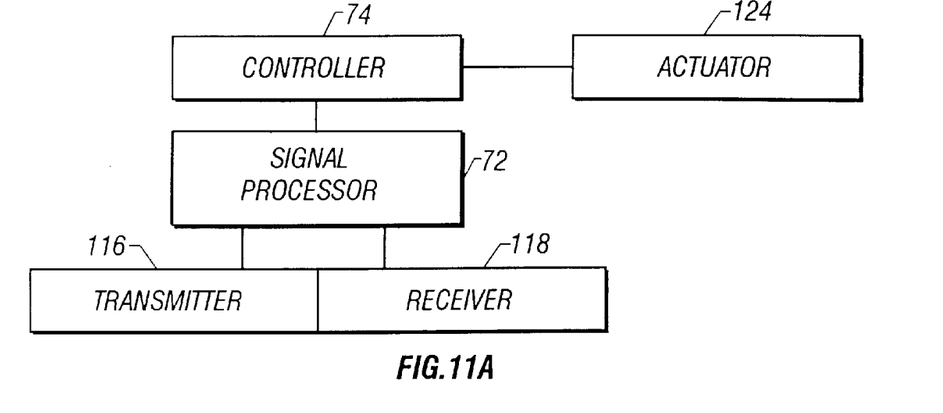
FIG. 11A shows a schematic diagram of another embodiment of the invention.
Figure 11B:
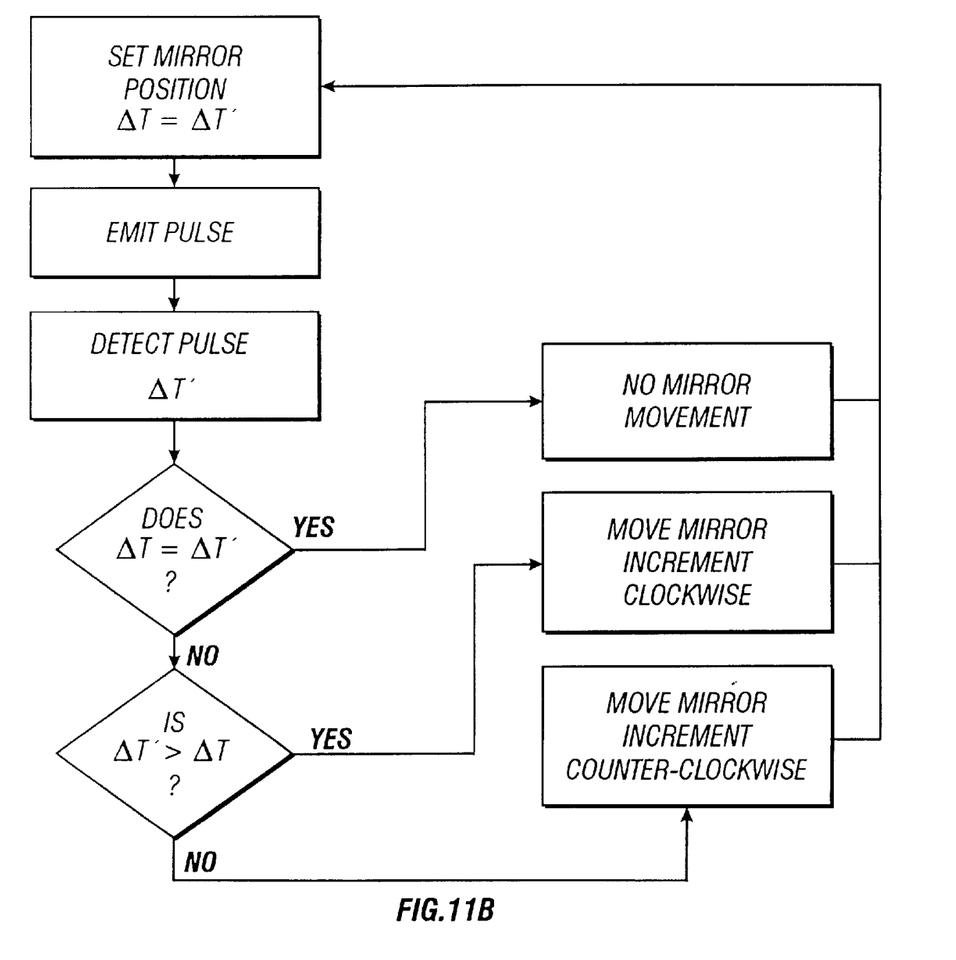
FIG. 11B is a flow chart of the operation of the embodiment shown in FIG. 11A.

FIG. 11A shows a schematic of an embodiment of the invention when a time to travel detection scheme is employed. The signal 44 (shown in FIG. 3) is processed in a manner shown by the flow chart provided in FIG. 11B. In the embodiment, the specific signal property is time to travel and is denoted as $\Delta T$. When the mirror 38 (shown in FIG. 3) is set in an initial default position, there will be a corresponding default value for time to travel denoted as $\Delta T$. When any distal variation between the reflective apparatus 22 (shown in FIG. 3) and a cooperatively located transmitter 116 and receiver 118 occurs, a different time to travel will be detected and will be denoted as $\Delta T'$. The two values, $\Delta T$ and $\Delta T'$, will be compared by a signal processor 72 and an appropriate command will be sent from a controller 74 to an actuator 124. As an example, if a right turn is initiated by the tow vehicle 10 (shown in FIG. 2B), the distance between the transmitter 116 and the reflective apparatus 22 (shown in FIG. 2B) will decrease. Thus, the newly detected value for $\Delta T'$ will be less than $\Delta T$. When this occurs, as shown in FIG. 11B, the controller 74 increments the actuator 124 in a counter-clockwise direction. The newly determined value for $\Delta T'$ is then used as the default value for $\Delta T$. The process is repeated until a steady value for $\Delta T$ is achieved. The process is similar when a turn is made in the other direction and when the tow vehicle 10 (shown in FIG. 2A) resumes straight-ahead travel. The example described above is only one embodiment of the invention and is not intended to limit the scope of the invention.

The tracking mirror system provides a number of advantages for operators of tow vehicles. The tracking mirror assembly is installed as a unit and may be easily retrofit to existing vehicles. The reflective apparatus is a simple addition to existing trailers, and the option of a removable reflective apparatus introduces the possibility of using any trailer with a tracking mirror equipped vehicle. The tracking mirror system may be installed on any vehicle-trailer combination and does not require special calibration for trailer length or vehicle-trailer separation distance. In some embodiments, substantially continuous transmission and reception of the signal may be maintained. The maintenance of a continuous signal and the confined nature of the signal transmission and reception also help prevent interference with external devices and drivers.

While the invention has been disclosed with reference to specific examples of embodiments, numerous variations and modifications are possible. Therefore, it is intended that the invention not be limited by the description in the specification, but rather by the claims that follow.

What is claimed is:

1. An automatic adjustment system for maintaining a line of sight between a driver and a rear end of a trailer attached to a tow vehicle, comprising:
   a transmitter and a receiver adapted to be mounted proximal a side-view mirror of the tow vehicle;
   a reflector adapted to be mounted proximal the rear end of the trailer, the reflector being arranged to receive a signal from the transmitter and reflect the signal to the receiver, wherein a selected property of the reflected signal has an initial value corresponding to an orientation of the side-view mirror when the line of sight is established;
   a control unit for determining a deviation from the initial value of the selected property of the reflected signal; and
   an actuator responsive to the control unit and arranged to orient the side-view mirror such that the value of the selected property of the reflected signal is returned to the initial value.

2. The automatic adjustment system of claim 1, wherein the reflector comprises means for removably mounting the reflector to the rear end of the trailer.

3. The automatic adjustment system of claim 1, wherein the transmission and reception of the signal are maintained continuously.

4. The automatic adjustment system of claim 1, wherein the transmitter is an optical transmitter and the receiver is an optical receiver.

5. The automatic adjustment system of claim 4, wherein the selected property of the signal is intensity.

6. The automatic adjustment system of claim 4, wherein the signal is an infrared light beam.

7. The automatic adjustment system of claim 4, wherein the signal is a polarized light beam.

8. The automatic adjustment system of claim 4, wherein the transmitter and the receiver, the control unit, and the actuator are disposed within a housing coupled to the mirror.

9. The automatic adjustment system of claim 8, wherein the housing is provided with an aperture through which the signal is transmitted and received.

10. The automatic adjustment system of claim 1, wherein the transmitter is an acoustic transmitter and the receiver is an acoustic receiver.

11. The automatic adjustment system of claim 10, wherein the selected property of the signal is time to travel.

12. The automatic adjustment system of claim 1, wherein the transmitter is a radio frequency transmitter and the receiver is a radio frequency receiver.

13. The automatic adjustment system of claim 1, wherein the mirror is returned to the selected orientation if the signal is interrupted.

14. The automatic adjustment system of claim 1, wherein the selected property of the signal is phase.

15. The automatic adjustment system of claim 1, wherein the receiver is a radial receiver.

16. The automatic adjustment system of claim 1, wherein the receiver is an array receiver.

17. The automatic adjustment system of claim 1, wherein the selected property of the signal is angle of reflection.

18. A tracking mirror for a tow vehicle, comprising:
   a side-view mirror movably coupled to a front portion of the tow vehicle;
   a transmitter and a receiver mounted proximal the side-view mirror;
   a reflector mounted proximal a rear end of a trailer connected to the tow vehicle, the reflector being arranged to receive a signal from the transmitter and reflect the signal to the receiver, wherein a selected property of the reflected signal has an initial value corresponding to an orientation of the side-view mirror when the line of sight is established;
   a control unit for determining a deviation in the initial value of the selected property of the reflected signal; and
   an actuator coupled to the mirror, the actuator being responsive to the control unit and arranged to orient the side-view mirror such that the value of the selected property of the reflected signal is returned to the initial value.

19. A method for maintaining a line of sight between a driver and a rear end of a trailer connected to a tow vehicle, comprising:

attaching a transmitter and a receiver proximal a side-view mirror of the tow vehicle;

attaching a reflector proximal the rear end of the trailer;

transmitting a signal from the transmitter to the reflector;

reflecting the signal back to the receiver;

analyzing the signal to determine a deviation from an initial value of a selected property of the signal corresponding to an orientation of the side-view mirror when the line of sight is established; and orienting the mirror responsive to the deviation such that the value of the selected property of the reflected signal is returned to the initial value.

20. The method of claim 19, wherein the selected property is intensity.

21. The method of claim 19, wherein the selected property is phase.

22. The method of claim 19, wherein the selected property is time to travel.

23. The method of claim 19, wherein the selected property is angle of reflection.

24. The method of claim 19, wherein transmission and reception of the signal are maintained continuously.

25. The method of claim 19, wherein the mirror is returned to an initial orientation if the signal is interrupted.

* * * * *